(12) United States Patent
Cho et al.

(10) Patent No.: US 7,957,974 B2
(45) Date of Patent: Jun. 7, 2011

(54) METHOD AND APPARATUS FOR CONTROLLING DEVICES CONNECTED TO HOME NETWORK

(75) Inventors: Jeong-mi Cho, Kyungki-do (KR);
Jay-woo Kim, Kyungki-do (KR);
Young-jin Hong, Kyungki-do (KR);
Jun-ho Park, Kyungki-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1679 days.

(21) Appl. No.: 10/388,749

(22) Filed: Mar. 17, 2003

(65) Prior Publication Data

US 2003/0187659 A1    Oct. 2, 2003

(30) Foreign Application Priority Data

Mar. 15, 2002    (KR) .................. 10-2002-0014096

(51) Int. Cl.
*G10L 21/00*    (2006.01)
*G06F 17/27*    (2006.01)

(52) U.S. Cl. .................. 704/275; 704/270.1; 704/270; 704/9

(58) Field of Classification Search .......... 704/270–275, 704/9
See application file for complete search history.

(56) References Cited

U.S. PATENT DOCUMENTS

| | | | |
|---|---|---|---|
| 4,797,924 A * | 1/1989 | Schnars et al. ................ 704/275 |
| 5,086,385 A * | 2/1992 | Launey et al. .................. 700/83 |
| 5,657,425 A * | 8/1997 | Johnson ........................ 704/275 |
| 5,802,488 A * | 9/1998 | Edatsune ....................... 704/231 |
| 6,052,666 A * | 4/2000 | Diehl et al. ................... 704/275 |
| 6,253,184 B1 * | 6/2001 | Ruppert ........................ 704/275 |
| 6,331,853 B1 | 12/2001 | Miyashita |
| 6,477,500 B2 * | 11/2002 | Maes ............................ 704/275 |
| 6,523,061 B1 * | 2/2003 | Halverson et al. ............ 709/202 |
| 6,535,854 B2 * | 3/2003 | Buchner et al. ............... 704/275 |
| 6,587,824 B1 * | 7/2003 | Everhart et al. ............... 704/275 |
| 6,895,379 B2 * | 5/2005 | Smyers et al. ............. 704/270.1 |

(Continued)

FOREIGN PATENT DOCUMENTS

CN    1430183 A    7/2003

(Continued)

OTHER PUBLICATIONS

European Search Report issued by the European Patent Office on Sep. 28, 2004 in corresponding application 03251572.8-2413.

(Continued)

*Primary Examiner* — E. Yen
(74) *Attorney, Agent, or Firm* — Staas & Halsey LLP

(57) ABSTRACT

A method and apparatus for controlling home electronic devices connected to a home network are provided. The method for controlling home electronic devices connected to a home network includes receiving a user voice command and converting the user voice command into a character command; extracting actions and objects from the character command and converting the character command into a logical command; extracting an action list containing a series of actions from the logical command by referring to an action library storing action data for controlling home electronic devices connected to the home network; and converting the series of actions included in the action list into a control signal and controlling the home electronic devices connected to the home network. According to the method and apparatus, user commands to home electronic devices connected to a complicated home network can be simplified such that home electronic devices are controlled conveniently and efficiently.

33 Claims, 10 Drawing Sheets

U.S. PATENT DOCUMENTS

| | | | |
|---|---|---|---|
| 6,970,824 B2 * | 11/2005 | Hinde et al. | 704/270.1 |
| 6,988,070 B2 * | 1/2006 | Kawasaki et al. | 704/275 |
| 2002/0178008 A1 * | 11/2002 | Reynar | 704/272 |
| 2003/0218606 A1 | 11/2003 | Zhirkov et al. | |

FOREIGN PATENT DOCUMENTS

| | | |
|---|---|---|
| EP | 0 911 808 A1 | 4/1999 |
| EP | 1 033 701 A2 | 9/2000 |
| EP | 1 063 637 A1 | 12/2000 |
| EP | 1 085 500 A2 | 3/2001 |
| EP | 1 033 701 A3 | 4/2001 |
| EP | 1 154 406 A1 | 11/2001 |
| JP | 63-69298 | 3/1987 |
| JP | 11-311996 | 11/1999 |
| JP | 2000-250575 | 9/2000 |
| JP | 2001-285314 | 10/2001 |
| JP | 2001-319045 | 11/2001 |
| JP | 2002-044765 | 2/2002 |
| KR | 2000-0045069 A | 7/2000 |
| KR | 2000-0049417 A | 8/2000 |
| KR | 2001-0014155 A | 2/2001 |
| WO | 99/57837 A2 | 11/1999 |
| WO | 99/57837 A3 | 11/1999 |
| WO | WO 00/59230 | 10/2000 |

OTHER PUBLICATIONS

Evans, Grayson, "Solving Home Automation Problems Using Artificial Intelligence Techniques," IEEE Transactions on Consumer Electronics 37 (Aug. 1991), No. 3, New York, US.

Japanese Office Action, with English-Language Translation, dated Feb. 19, 2007.

Chinese Office Action for corresponding to Chinese Patent Application No. 2006800115812 dated Jan. 29, 2010, 11 pgs.

Japanese Office Action for corresponding Japanese Patent Application No. 2007-25064 dated Jun. 8, 2010 (12 pgs).

* cited by examiner

METHOD AND APPARATUS FOR CONTROLLING DEVICES CONNECTED TO HOME NETWORK

This application claims priority from Korean Patent Application No. 2002-14096, filed Mar. 15, 2002, the contents of which are incorporated herein by reference in their entirety.

BACKGROUND OF THE INVENTION

1. Field of the Invention

The present invention relates to a method and apparatus for controlling home electronic devices connected to a home network, and more particularly, to a method and apparatus for controlling home electronic devices connected to a home network through voice command processing.

2. Description of the Related Art

In a home network environment, comprehensive information home electronic devices, in which digital broadcasting receivers, networked home electrical appliances, information communication devices, digital broadcasting programs, digital Internet contents, and high speed wired and wireless communication services are combined, have been introduced such that a variety of convenient functions are available to users. However, the manipulation and control have become more complicated. The user should sequentially direct a series of steps so that a home electronic device can provide predetermined services. For this, the user should understand interoperations between home electronic devices. For example, in order to reproduce a file stored in a personal computer (PC) on a TV, the user should inconveniently order or select 7 steps sequentially: select download menu of a digital TV→select download from a PC→connect the PC→search for video programs that can be downloaded from the PC→select a desired video program→download the file from the PC to the digital TV→reproduce the file in the digital TV.

Voice is the most effective and natural means for communications in daily life, and voice command processing has been developed as an advanced form of man-machine interface following the development of voice recognition technology.

Technologies for controlling a single device through voice command processing have been disclosed in a number of patents. U.S. Pat. Nos. 4,340,797, 4,340,798, 4,340,799, and 4,513,189 all relate to technology for controlling an oven by human voice, and disclose technologies by which selection of functions and power of an oven is performed in the form of a dialogue by voice. Also, U.S. Pat. No. 4,520,576 relates to a technology for controlling a washing machine through voice, and discloses the technology for controlling the washing processes through voice recognition and synthesis. Besides, there are many prior art technologies having different application objects, including a voice responsive dialing technology disclosed in U.S. Pat. No. 5,222,121, a voice responsive camera technology disclosed in U.S. Pat. No. 4,389,109, and a voice Internet command processing technology disclosed in Korean Patent Publication No. 2000-49417.

These technologies all relate to performing a single function of an independent home electronic device, and a voice command simply replaces the function of a button of a home electronic device. These technologies can be implemented by simple mapping between voice patterns and a function. European Patent No. 1,063,637 defines a module for changing a voice database, or a command definition module in accordance with installing a new device, but this also relates to a single home electronic device control system by comparison of voice that is stored in advance, with input voice.

Technologies for controlling home electronic devices connected to a home network through voice command processing have been disclosed in a number of patents. U.S. Pat. No. 6,243,707 and Korea Patent No. 2001-14155 relate to methods for controlling home electronic devices in a home network based on a browser, in which technologies for defining macro functions in order to reduce a series of command steps repeated by a user are disclosed. That is, using browser-based interfaces, a series of command steps desired by the user are sequentially stored as macros and execution of these macros replaces a series of command steps.

Though the command processing technologies using macro definitions provide user convenience by reducing the complexity of complicated control when compared to other prior art technologies, the user should still create every macro for the command processing technologies using macro definitions, and the user should generate the entire macros to modify a part of macros.

Besides, European Patent No. 1,085,500 relates to a module preprocessing a voice command for controlling a home electronic device, and discloses a voice command recognition method which recognizes a predetermined voice signal, a continuous command recognition method by time intervals, and a technology for controlling sounds of ambient home electronic devices after recognizing a voice command.

Also, Korea Patent No. 2000-45069 relates to a remote control technology and discloses a voice recognition home automation method and a method for controlling from the outside of a house home electronic devices using the voice recognition home automation method, by which devices that can be controlled by a remote controller among ordinary home devices and are connected to power are controlled from the outside of the house by a voice signal through a telephone set.

However, among the disclosed prior art technologies there is no technology by which home electronic devices are controlled by a simple voice command of a user after complicated multi-step user commands are reduced in order to control the home electronic devices connected to a home network.

SUMMARY OF THE INVENTION

The present invention provides a method and apparatus for controlling home electronic devices connected to a home network so that a user can control operations of home electronic devices conveniently and efficiently in a more complicated home network environment According to an aspect of the present invention, there is provided a method for controlling home electronic devices connected to a home network comprising receiving a user voice command and converting it into a character command; extracting actions and objects from the converted character command and converting the character command into a logical command; extracting an action list containing a series of actions from the logical command by referring to an action library storing action data for controlling home electronic devices connected to the home network; and converting the series of actions included in the action list into a control signal and controlling the home electronic devices connected to the home network.

It is preferable that the step of extracting and converting actions and objects comprises extracting actions and objects from the character command; loading semantic information of the extracted actions and objects; and removing the semantic ambiguity problem of the actions and objects by using the loaded semantic information of the actions and objects.

It is preferable that a data structure of action data stored in the action library includes at least one of an action header which indicates the action, a prerequisite which is needed to perform the action, sub-actions which are needed to complete execution of the action, and an action effect which is the result of execution of the action.

It is preferable that the step of extracting an action list comprises: determining whether or not a prerequisite included in the action data corresponding to the logical command is satisfied; if the determination result indicates that the prerequisite is not satisfied and an action capable of satisfying the prerequisite is in the action library, searching for the action; if the determination result indicates that the prerequisite is not satisfied and an action capable of satisfying the prerequisite is not in the action library, outputting an error message; if the prerequisite included in the action data corresponding to the logical command is satisfied and there are sub-actions, searching for the sub-actions from the action library; and if the prerequisite included in the action data corresponding to the logical command is satisfied and there are no more sub-actions, writing the action in the action list.

It is preferable that in the step of determining whether a prerequisite is satisfied, whether or not the prerequisite is satisfied is determined by referring to a device state library which stores state information of home electronic devices connected to the home network.

It is preferable that the device state library stores at least a device ID, an action, and a device state.

It is preferable that the method further comprises reporting the result of execution of an action by controlling the home electronic devices connected to the home network.

It is preferable that the step of reporting the result comprises: receiving the result of execution of an action from a home electronic device connected to the home network; and outputting a result message containing the received result of execution of the action.

It is preferable that the result message includes an execution result success message or an execution result failure message and the execution result failure message includes information on the home electronic device in which an error occurred.

It is preferable that the method further comprises monitoring the states of home electronic devices which change according to the control of the home electronic devices connected to the home network.

It is preferable that the step of monitoring the states comprises receiving changed home electronic device state information from the home electronic devices connected to the home network; and updating a device state library which stores the state information of home electronic devices connected to the home network, by using the received home electronic device state information.

According to another aspect of the present invention, there is provided an apparatus for controlling home electronic devices connected to a home network comprising: an action library which stores action data for controlling the home electronic devices connected to the home network; a voice recognition unit which receives a user voice command and converts it into a character command; a command interpretation unit which extracts actions and objects from the recognized character command and converts into a logical command; an action planning unit which extracts an action list containing a series of actions from the logical command by referring to the action library; and a home electronic device control unit which converts the series of actions contained in the action list into a control signal and controls the home electronic devices connected to the home network.

It is preferable that the command interpretation unit comprises a command surface analysis unit which extracts actions and objects of the command from the character command and loads semantic information of the extracted actions and objects; and a command deep analysis unit which removes the semantic ambiguity problem of the actions and objects by using the loaded semantic information of the actions and objects.

It is preferable that the data structure of the action data stored in the action library includes at least one of an action header which indicates the action, a prerequisite which is needed to perform the action, sub-actions which are needed to complete execution of the action, and an action effect which is the result of execution of the action.

It is preferable that if the result of determining whether or not a prerequisite included in the action data corresponding to the logical command is satisfied indicates that the prerequisite is not satisfied and an action capable of satisfying the prerequisite is not in the action library, the action planning unit outputs an error message.

It is preferable that if the result of determining whether or not a prerequisite included in the action data corresponding to the logical command is satisfied indicates that the prerequisite is not satisfied and an action capable of satisfying the prerequisite is in the action library, the action is searched.

It is preferable that the sub-action is searched from the action library in case that the prerequisite included in the action data corresponding to the logical command is satisfied and sub-action is in the action library.

It is preferable that the action is written in the action list in case that the prerequisite included in the action data corresponding to the logical command is satisfied and further sub-action is not in the action library.

It is preferable that a determination is made as to whether or not the prerequisite is included in the action data corresponding to the logical command by referring to a device state library which stores state information of the home electronic devices connected to the home network.

It is preferable that the device state library stores at least a device ID, an action, and a device state.

It is preferable that the apparatus further comprises a response management unit which reports the result of execution of an action by controlling the home electronic devices connected to the home network.

It is preferable that the response management unit receives the result of execution of an action through the device control unit from a home electronic device connected to the home network and outputs a result message containing the received result of execution of the action.

It is preferable that the result message is output in the form of voice or characters.

It is preferable that the result message includes an execution result success message or an execution result failure message and the execution result failure message includes information on the home electronic device in which an error occurred.

It is preferable that the apparatus further comprises a device monitoring unit which monitors the states of home electronic devices which change according to the control of the home electronic devices connected to the home network.

It is preferable that the device monitoring unit receives changed home electronic device state information from the home electronic devices connected to the home network and updates the device state library which stores the state information of home electronic devices connected to the home network, by using the received home electronic device state information.

BRIEF DESCRIPTION OF THE DRAWINGS

The above objects and advantages of the present invention will become more apparent by describing in detail preferred embodiments thereof with reference to the attached drawings in which.

DESCRIPTION OF THE PREFERRED EMBODIMENTS

Figure 1:
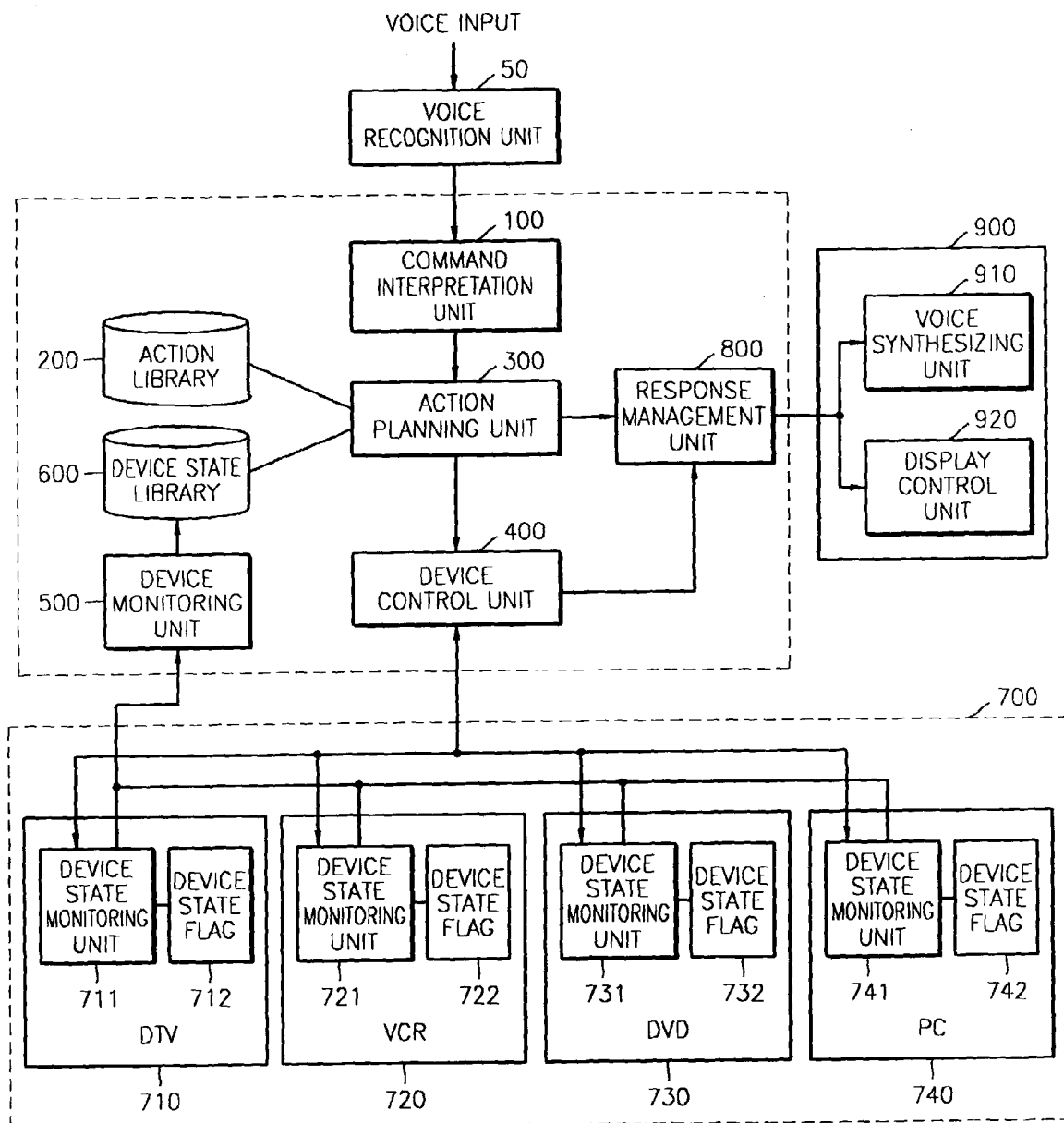
FIG. 1 is a schematic block diagram of an example of a home electronic device controlling apparatus according to the present invention.

FIG. 1 shows a home electronic device controlling apparatus which comprises a voice recognition unit 50, a command interpretation unit 100, an action library 200, an action planning unit 300, a device control unit 400, a device monitoring unit 500, a device state library 600, a response management unit 800, and an output unit 900.

The voice recognition unit 50 converts a user voice command which is input to the home electronic device controlling apparatus, into a text command. That is, the voice recognition unit 50 receives a user voice command through a voice input apparatus, recognizes this command, and converts it into a character command.

The command interpretation unit 100 interprets the character command which is output from the voice recognition unit 50, and converts it into a logical command format. The structure and operation of the command interpretation unit 100 will be explained in more detail later referring to FIGS. 2 and 3.

Referring to the action library 200, the action planning unit 300 extends the logical command, which it receives from the command interpretation unit 100, to a series of an action list for controlling the home electronic device. The operation of the action planning unit 300 will be explained in detail later referring to FIG. 6.

The action library 200 stores actions for controlling home electronic devices, in a data structure formed by a prerequisite, sub-actions, and an effect. The data structure of the action library 200 will be explained in detail later referring to FIGS. 4 and 5.

The device control unit 400 controls a home electronic device by using an action list output from the action planning unit 300 and extracts the result of action execution. That is, the device control unit 400 converts the action list into a control signal for controlling the home electronic device and transmits the control signal such that the home electronic device can be controlled. The detailed structure of the device control unit 400 will be explained in detail later referring to FIG. 8.

The device monitoring unit 500 monitors the state of the home electronic device resulting from the execution of an action and stores the state in the device state library 600. The structure of the device monitoring unit 500 will be explained in detail later referring to FIG. 10.

Home electronic devices 700 are devices connected to a home network and include a digital TV (DTV) 710, a VCR 720, a DVD player 730, and a PC 740. Each device has a device state monitoring unit 711 and a device state flag 712. Each device state flag is set according to the state of the device. The device state monitoring unit monitors the device state by referring to the flag, and reports the state to the device control unit 400 and the device monitoring unit 500.

The response management unit 800 generates a response based on the action execution result, which it receives from the device control unit 400, and sends the response to the output unit 900. The structure of the response management unit 800 will be explained in detail later referring to FIG. 12.

The output unit 900 outputs the response, which it receives from the response management unit 800, through the voice synthesizing unit 910 and the display control unit 920.

Figure 2:
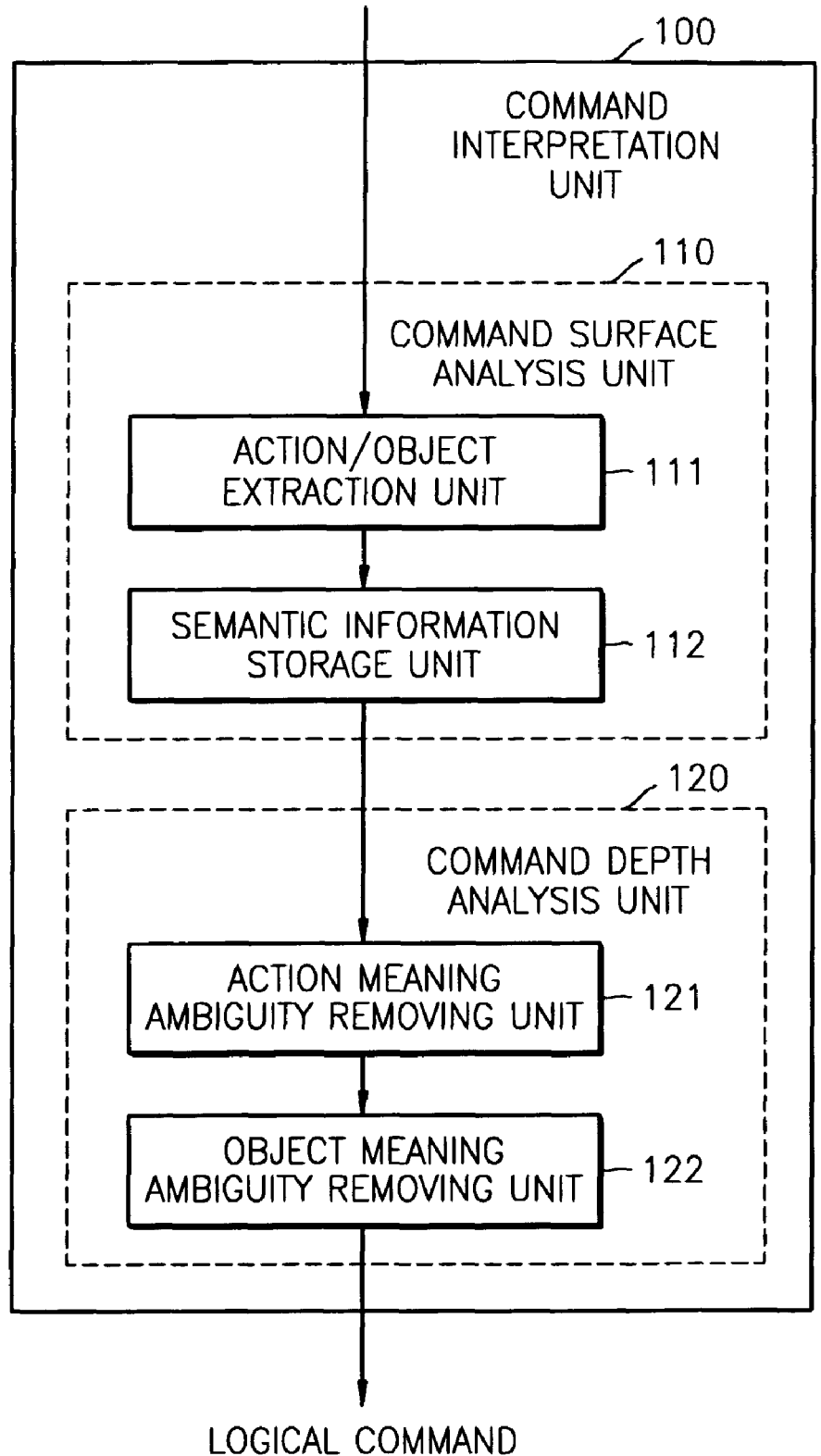
FIG. 2 is a block diagram showing the detailed structure of a command interpretation unit shown in FIG. 1.

FIG. 2 is a block diagram showing the detailed structure of the command interpretation unit 100 shown in FIG. 1.

The command interpretation unit 100 shown in FIG. 2 comprises a command surface analysis unit 110 which performs morpheme and syntax analysis, and a command deep analysis unit 120 which performs semantic analysis.

An action/object extraction unit 111 of the command surface analysis unit 110 performs morpheme and syntax analysis of the received character command, then analyzes verbs, nouns, and their modification relations, and extracts actions and objects of the command based on the analysis. A semantic information storage unit 112 stores all semantic information corresponding to the extracted actions and objects into the memory (not shown).

The command deep analysis unit 120 analyzes the meaning of the result provided by the semantic information storage unit 112 and removes the semantic ambiguity of the action and object. That is, the action meaning ambiguity removing unit 121 removes the semantic ambiguity of the action and the object meaning ambiguity removing unit 122 removes the semantic ambiguity of the object so as to determine one meaning, and outputs the determined logical command.

Figure 3:
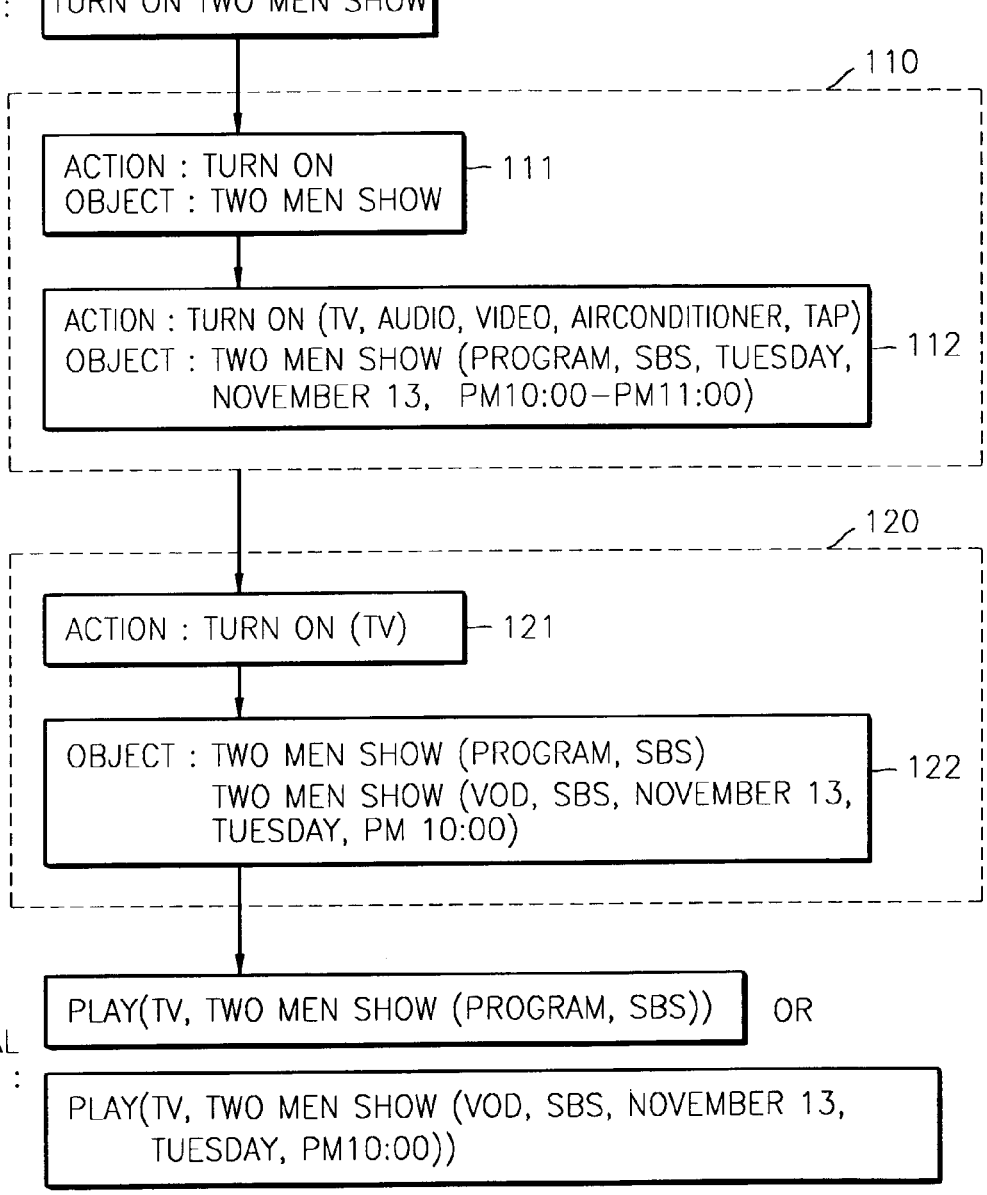
FIG. 3 is a diagram for explaining operations in the command interpretation unit shown in FIG. 1.

Referring to FIG. 3, the operation of the command interpretation unit 100 will now be explained. For example, if the command interpretation unit 100 receives a character command, "Turn on Two Men Show," from the voice recognition unit 50, the action/object extraction unit 111 extracts "turn on" as an action from the receive character command, and extracts "Two Men Show" as an object.

Next, the semantic information storage unit 112 stores TV, audio, video air conditioner, and tap as information related to the meaning of "turn on" and stores program, SBS, Tuesday, 10:00-11:00 PM, and November 13 as information related to the meaning of "Two Men Show".

Then, the action meaning ambiguity removing unit 121 determines TV-play as the action because "Two Men Show" is a TV program.

If the time when the command is received is Tuesday 10:00 PM, the program being aired on the SBS TV channel should be displayed and the object meaning ambiguity removing unit 122 determines a program as semantic information of the object. If the time when the command is received is after Tuesday, VOD service should be received and the object meaning ambiguity removing unit 122 determines VOD as semantic information of the object.

Accordingly, depending on the time when the command is finally received, the command interpretation unit 100 outputs a logical command of play (TV, Two Men Show (program, SBS)) or play (TV, Two Men Show (VOD, SBS, November 13, Tuesday, 10:00 PM).

Figure 4:
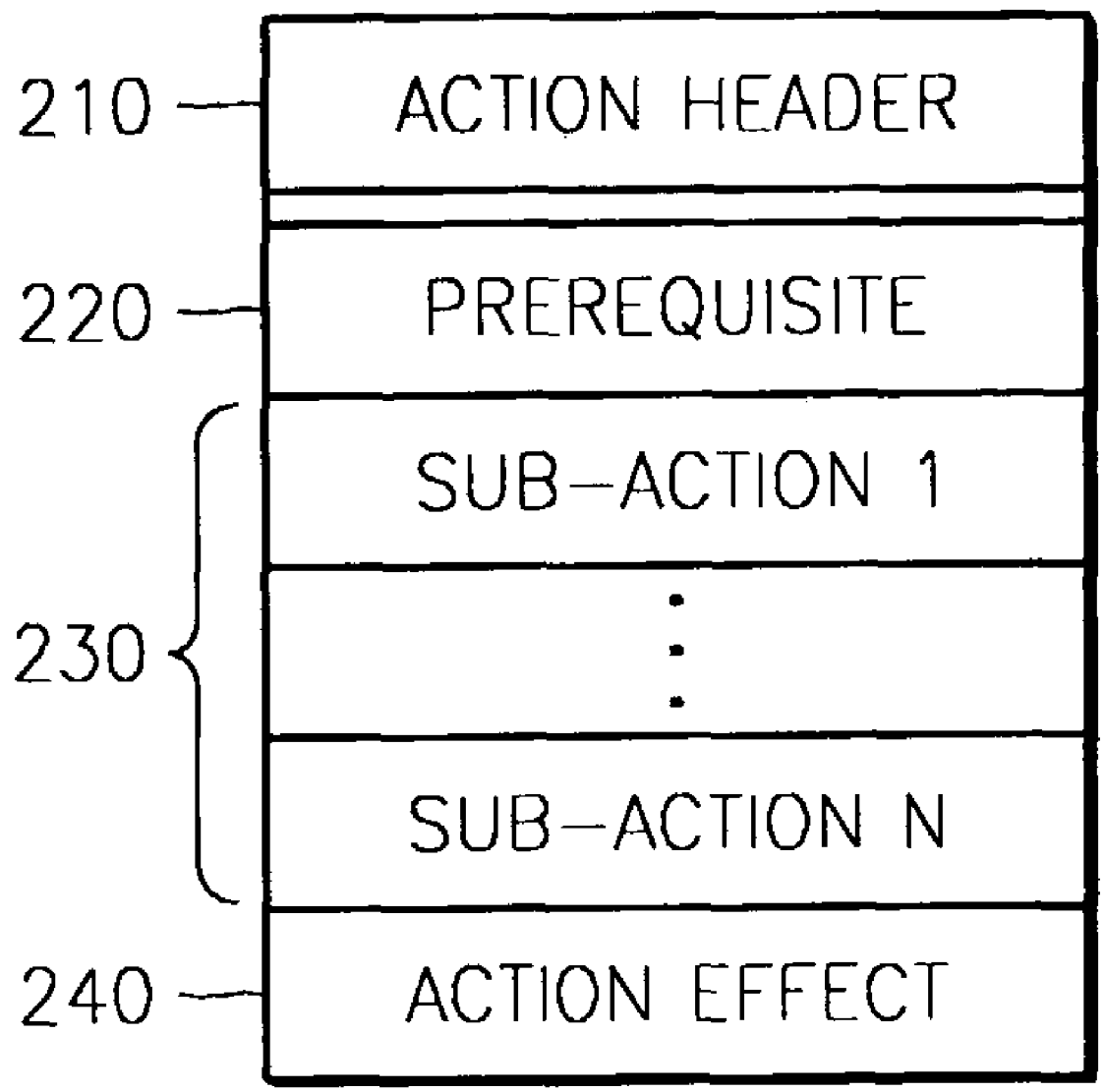
FIG. 4 is a diagram for explaining the structure of data stored in an action library shown in FIG. 1.
Figure 5:
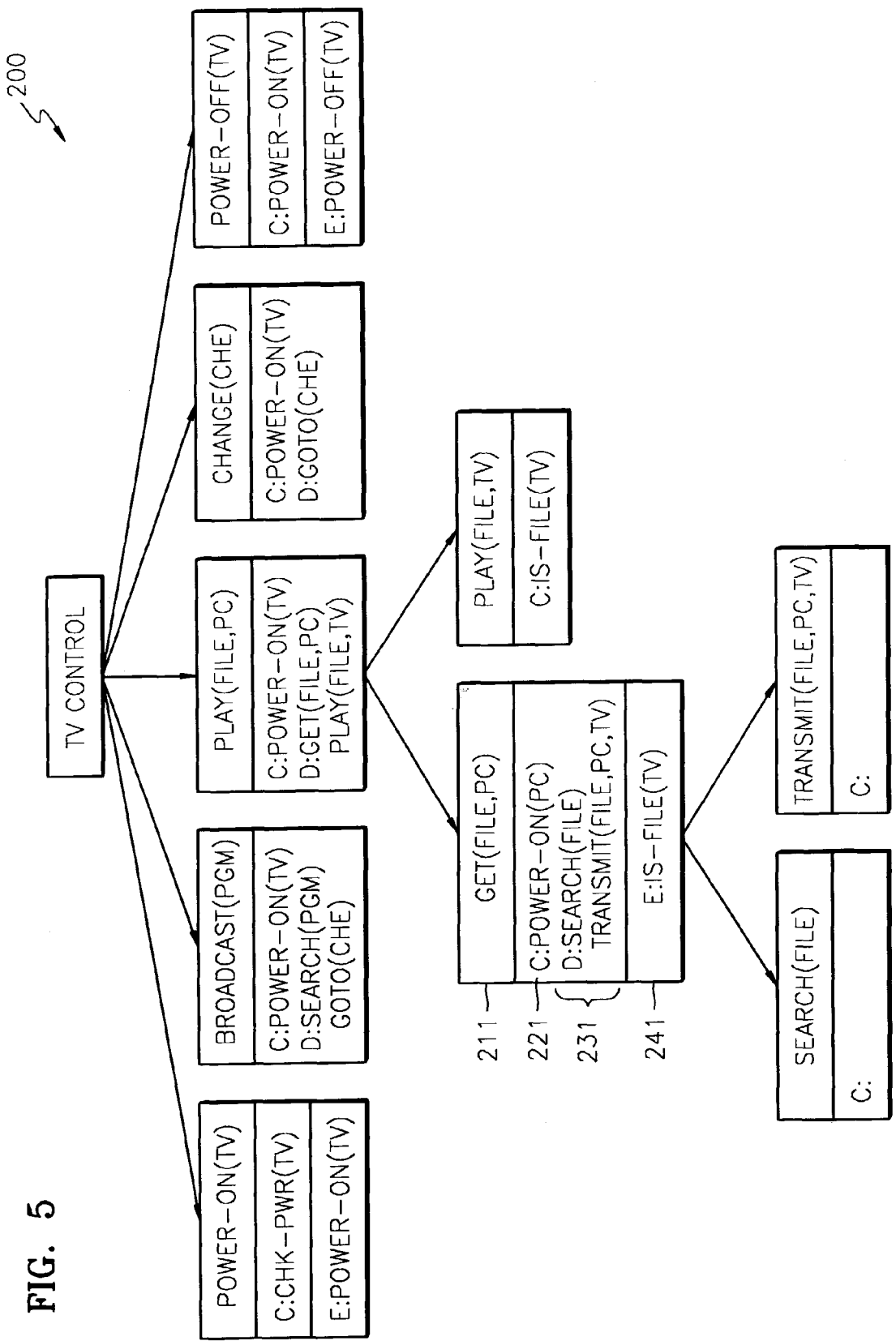
FIG. 5 is a diagram for explaining an example of the data structure shown in FIG. 4.

FIG. 4 is a diagram of the structure of data stored in the action library 200, and FIG. 5 is a diagram of an example of the data structure stored in the action library 200.

The data structure includes an action header 210, a prerequisite 220, sub-actions 1, . . . , N 230, and an action effect 240. The prerequisite 220 of the action is a condition which should be satisfied in order to perform the action. This means, for example, in order to perform the action "Change TV channel (CHANGE(CHE))" as shown in FIG. 5, a prerequisite "TV should be turned on (POWER-ON(TV))" should be satisfied.

The action effect 240 is a result which is achieved by performing the action. For example, if the action "Transmit a predetermined file from PC to TV (GET(FILE,PC))" as shown in FIG. 3 is successfully performed, a state "A predetermined file is in TV (IS-FILE(TV))" is achieved as the result.

Sub-actions 230 of the action are sequential steps for performing the action. For example, an action "Reproduce a PC file on TV (PLAY(FILE,PC))" as shown in FIG. 3 is divided into detailed steps "connect PC (POWER-ON(PC))→search for a file in PC (SEARCH(FILE))→transmit a file from PC to TV (TRANSMIT(FILE,PC,TV))→reproduce a file on TV (PLAY(FILE,TV))".

Thus constructing the action library clarifies preceding/succeeding relations between actions and a series of an action list can be extracted from the suggestive user command.

Figure 6:
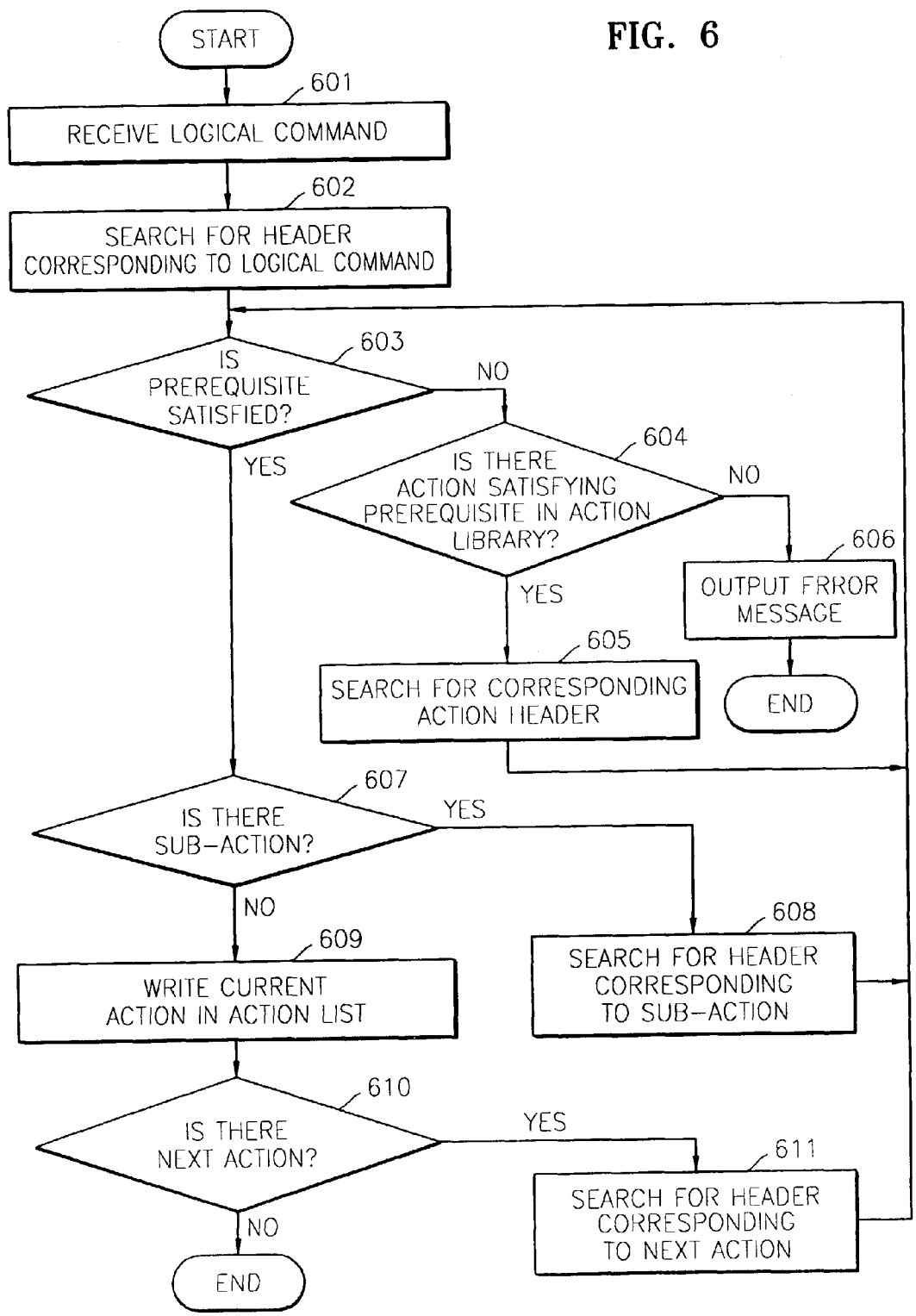
FIG. 6 is a flowchart of the steps performed in an action planning unit shown in FIG. 1.

Referring to FIG. 6, the operation of the action planning unit 300 will now be explained. The action planning unit 300 receives the command in the form of a logical command and extracts an action list. The action list is a series of action steps for performing the input logical command.

First, if the logical command from the command interpretation unit 100 is received in step 601, the action planning unit 300 searches for an action header corresponding to the logical command from the action library 200 in step 602, and determines whether or not a prerequisite in the action header is satisfied by referring to the device state library 600 in step 603. The states of devices controlled by the home electronic device controlling apparatus are stored in the device state library 600.

If the prerequisite is not satisfied, it is determined whether or not there is an action that can satisfy the prerequisite, in the action library in step 604. If such an action is not in the action library (that is, when control is not possible), the action planning unit 300 outputs an error message to the response management unit 800 and stops operation. For example, in the case of a command ordering TV power to be turned on, the prerequisite is that a power cord should be plugged in. If there is no action that can satisfy the prerequisite, in the action library, the home electronic device cannot be controlled any more in the situation and accordingly an error message is output in this case.

If it is determined as the result of the step 604 that the action which can satisfy the prerequisite is in the action library, the prerequisite should be performed first. Accordingly the action that can satisfy the prerequisite is searched in step 605, and then the step 603 is performed.

Next, it is determined whether or not there is a sub-action in the action library 200 in step 607. If there is a sub-action, an action header corresponding to the sub-action is searched again from the action library 200 and then the step 603 is performed. If there is no sub-action, the current action is written in the action list in step 609.

Then, it is determined whether or not there is a next action in step 610. If there is a remaining next action, an action header corresponding to the next action is searched in step 611 and step 603 is performed. If there is no next action, the operation stops.

Figure 7:
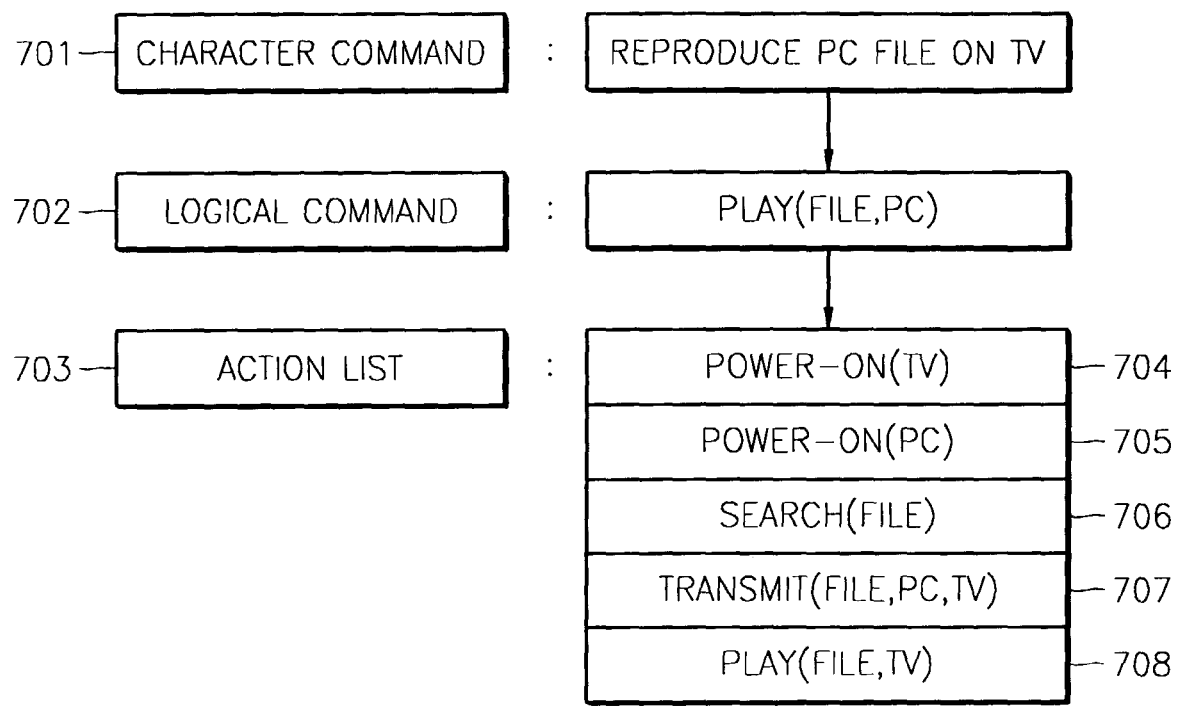
FIG. 7 is a diagram for explaining operations of a command interpretation and action planning unit shown in FIG. 1 with a specific example.

Referring to FIG. 7, the operations of the command interpretation unit 100 and the action planning unit 300 will now be explained through a specific example.

If the command interpretation unit 100 receives a character command 701 "Reproduce a PC file on TV", the command interpretation unit 100 interprets the character command, converts it into a logical command 702 "PLAY(FILE,PC)", and outputs the logical command 702 to the action planning unit 300. Then, the action planning unit 300 extends the received logical command to an action list 703.

Referring to FIGS. 5 and 7, extension of "PLAY(FILE,PC))" to an action list will now be explained. There is a prerequisite POWER-ON(TV) for "PLAY(FILE,PC))". If the result of search for the device state library indicates that the prerequisite is not satisfied, an action which can satisfy the prerequisite POWER-ON(TV) is searched in the action library. That is, an action whose action effect is POWER-ON(TV) is searched and the result action POWER-ON(TV) is searched. If it is assumed that the prerequisite of the action POWER-ON(TV) is satisfied, there is no sub-action for the action and therefore POWER-ON(TV) is written as the first action 704 of the action list.

As next sub-actions there are GET(FILE,PC) and PLAY(FILE,TV). If GET(FILE,PC) is searched by the action header, there is a prerequisite POWER-ON(PC). If the result of search for the device state library indicates that the prerequisite is not satisfied, an action that can satisfy the prerequisite is searched in the action library, and as a result, action POWER-ON(PC) is searched. If it is assumed that the prerequisite of the action POWER-ON(PC) is satisfied and there is no sub-action, POWER-ON(PC) is written as the second action 705 that should be performed.

Next, there are SEARCH(FILE) and TRANSMIT(FILE,PC,TV) as sub-actions. If it is assumed that SEARCH(FILE) is searched by the action header, the prerequisite is satisfied and there is no sub-action, SEARCH(FILE) is written as the third action 706. If it is assumed that TRANSMIT(FILE,PC,TV) is searched by the action header, the prerequisite is satisfied and there is no sub-action, TRANSMIT(FILE,PC,TV) is written as the fourth action 707.

Next, since there is no more sub-action, if it is assumed that the next action PLAY(FILE,TV) is searched by the action header, the prerequisite is satisfied and there is not sub-action, PLAY(FILE,TV) is written as the fifth action 708. Then, since there is no more remaining action, the writing of the action list is finished.

Through this process, the logical command 702 PLAY(FILE,PC) is extended to the action list 703 comprising POWER-ON(TV) 704, POWER-ON(PC) 705, SEARCH (FILE) 706, TRANSMIT(FILE,PC,TV) 707, and PLAY(FILE,TV) 708.

Figure 8:
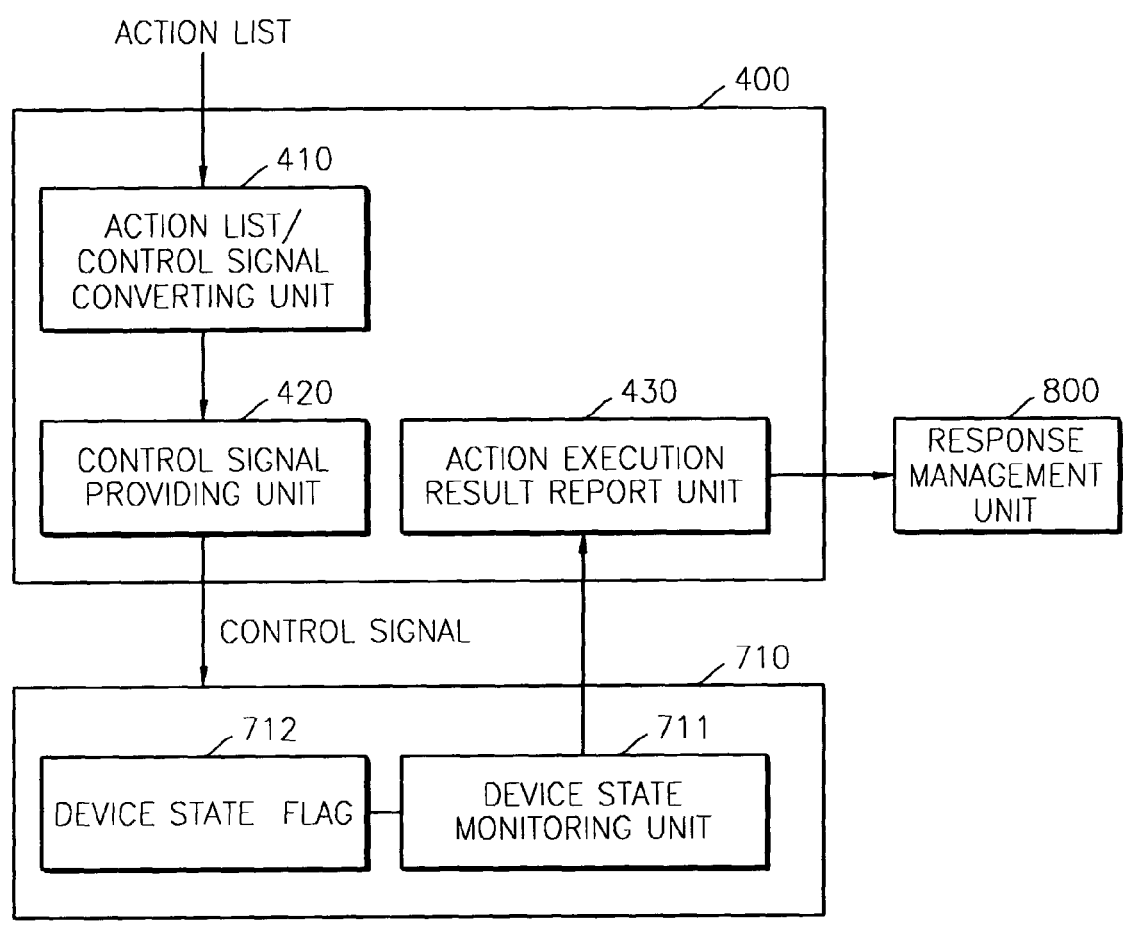
FIG. 8 is a block diagram of a detailed structure of a device control unit shown in FIG. 1.

The detailed structure of the device control unit 400 will now be explained referring to FIG. 8.

The device control unit 400 comprises an action list/control signal converting unit 410, a control signal providing unit 420, and an action execution result report unit 430.

The action list/control signal converting unit 410 converts each action in the action list, which is provided by the action planning unit 300, into a signal for controlling an individual home electronic device.

Figure 9:
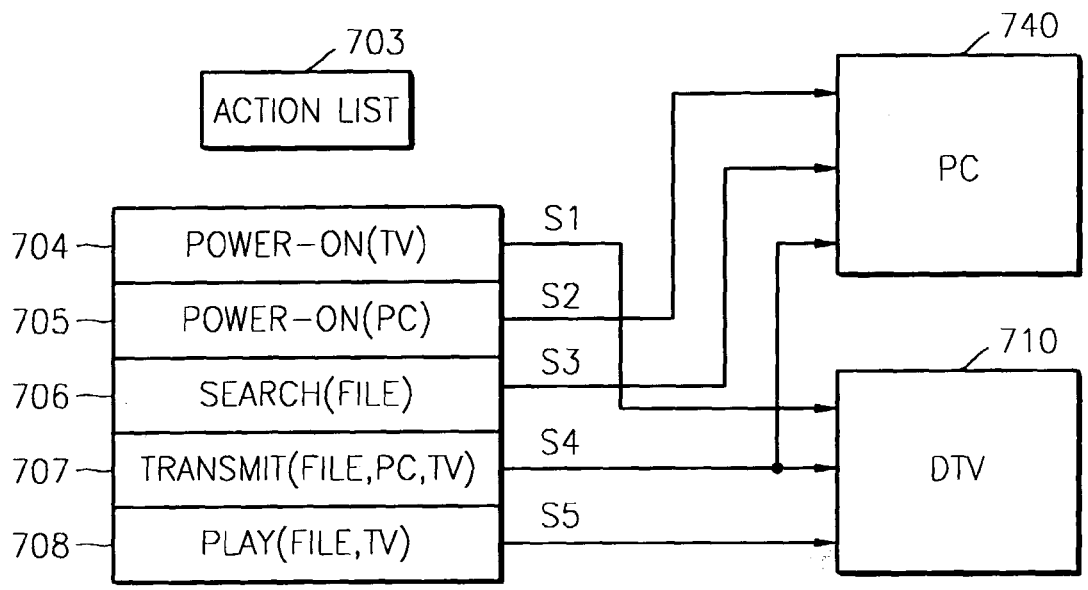
FIG. 9 is a diagram for explaining operations of a device control unit with a specific example.

The control signal providing unit 420 transmits the converted home electronic device control signal to the home electronic device 710 connected to a home network. Referring to FIG. 9, an operation for controlling a home electronic device by using the action list 703 shown in FIG. 7 will be explained below. Action POWER-ON(TV) 704 is converted into control signal S1 and transmitted to the DTV 710; action POWER-ON(PC) 705 is converted into control signal S2 and transmitted to the PC 740; action SEARCH(FILE) 706 is converted into control signal S3 and transmitted to the PC 740; action TRANSMIT(FILE,PC,TV) 707 is converted into control signal S4 and transmitted to the DTV 710 and PC 740; and action PLAY(FILE,TV) 708 is converted into control signal S5 and transmitted to the DTV 710. Through this process, home electronic devices can be controlled in a logical operation order.

The action execution result report unit 430 receives a report on whether or not each action is successfully executed and transmits the received action execution result report to the response management unit 800. For example, the action execution result report unit 430 may receive from the device state monitoring unit 711 a report that the action is successful, or may receive a report that the action is not successful and outputs an error message to the response management unit 800. If the action fails, an error result is reported by a device in which the error occurred. Accordingly, the device or a step of the execution of the action in which the error occurred can be accurately identified.

Figure 10:
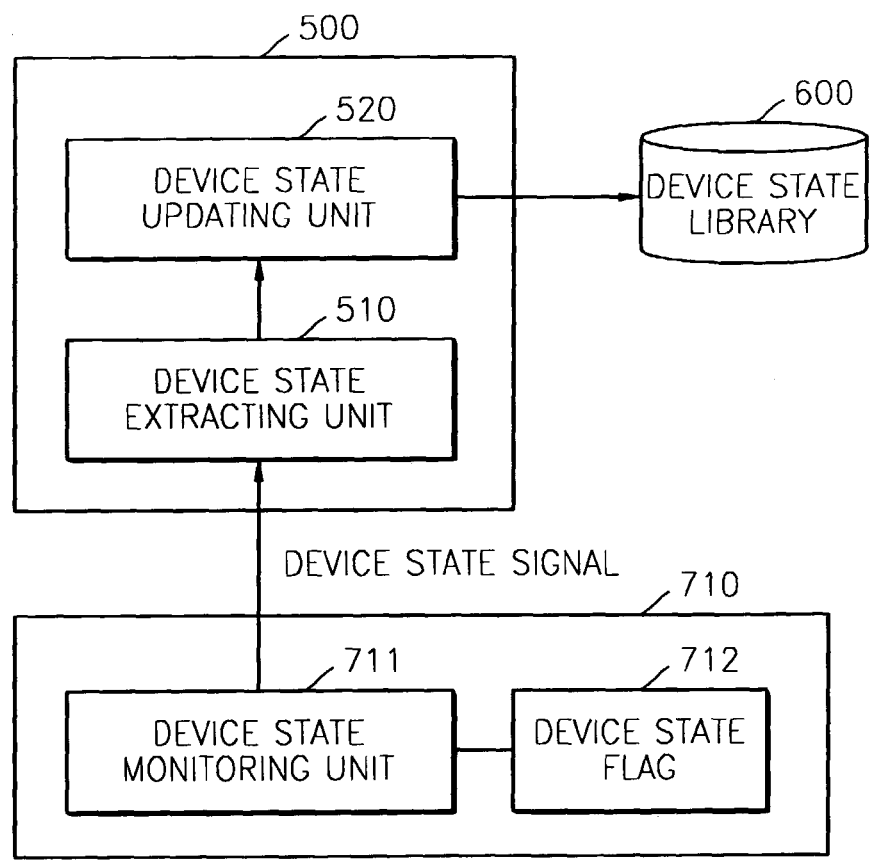
FIG. 10 is a block diagram of a detailed structure of a device monitoring unit shown in FIG. 1.

FIG. 10 is a block diagram of a detailed structure of a device monitoring unit 500.

The device monitoring unit 500 comprises a device state extracting unit 510 and a device state updating unit 520. The device state monitoring unit 711 monitors the device state flag 712, and if there is a change in the state of the flag, transmits a message indicating the changed state of the device state flag, to the device state extracting unit 510. The device state extracting unit 510 receives the device state message, and extracts the device state. The device state updating unit 520 updates the device state library 600 with the device state extracted by the device state extracting unit 510.

Figure 11:
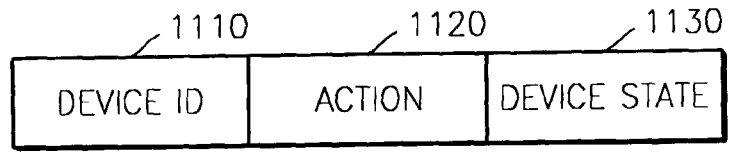
FIG. 11 is a diagram for explaining the structure of data stored in a device state library shown in FIG. 1.

The structure of device state data stored in the device state library 600 is as shown in FIG. 11. The data structure includes a device ID 1110, an action 1120, and a device state 1130. For example, "TV", "POWER-ON", and "ON" may be stored in the device ID 1110, action 1120, and device state 1130, respectively.

Figure 12:
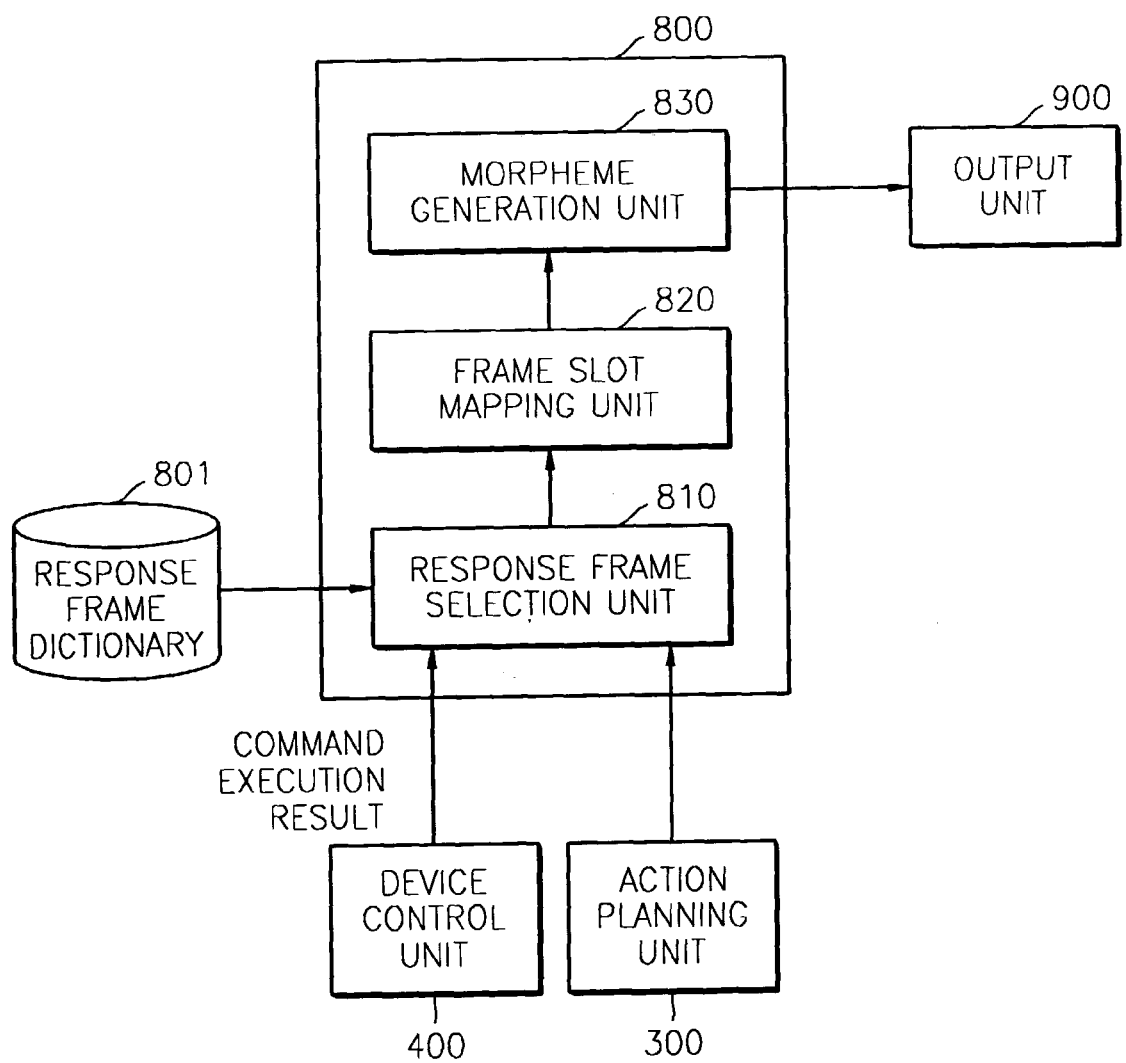
FIG. 12 is a block diagram showing a detailed structure of a response management unit shown in FIG. 1.

FIG. 12 is a block diagram showing a detailed structure of a response management unit shown in FIG. 1.

The response management unit 800 receives the action execution result from the device control unit 400 and informs the user of the action execution result. Even when there is no action that can satisfy a prerequisite, in the action library in the action list generation step, an error message can be output. Accordingly, the response management unit 800 can receive a message from the action planning unit 300.

If the response management unit 800 receives the result of execution of a command from the device control unit 400 or the action planning unit 300, a response frame selection unit 810 selects an appropriate response frame by referring to a response frame dictionary 801 which is a database of response frames and a frame slot mapping unit 820 determines a slot value of the response frame. A morpheme generation unit 830 converts the received response frame into a character-type response through a morpheme generation process, and outputs the converted response to the output unit 900.

The present invention can be realized as a code on a recording medium which can be read out by a computer. Here, the recording medium includes any kind of recording devices in which data are recorded, such as ROM, RAM, CD-ROM, a magnetic tape, a floppy disk, and an optical data recording device, while further including a carrier wave, i.e., transmission over the Internet. In addition, the recording media read out by a computer are distributed to computer systems, connected by a network, to record and execute codes, which can be read out by a computer, in a distribution manner.

According to the present invention as described above, a series of command steps can be performed by a suggestive command such that user commands can be reduced. Also, a response which accurately indicates the result of execution of a command can be generated, and if execution of a command fails, the user is accurately informed of the cause of the failure such that convenience in control of a network can improve and a convenient and efficient interface to a complicated home network control can be provided.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A method for controlling home electronic devices connected to a home network comprising:
    (a) receiving a user voice command and converting the user voice command into a character command;
    (b) converting the character command into a logical command, comprising:
    (b1) extracting actions and objects from the character command,
    (b2) storing semantic information related to the meaning of the extracted actions and semantic information related to the meaning of the extracted objects, and
    (b3) analyzing the stored semantic information to remove semantic ambiguity from the actions and objects based on the semantic information of the character command and outputting the logical command based on the analysis, wherein a time that the character command is received is used to interpret a meaning of an object;
    (c) generating an action list comprising a series of actions used to execute the logical command by searching an action library storing action data for controlling the home electronic devices connected to the home network, wherein the generated action list is influenced by which electronic devices are currently connected to the home network and by state information of the electronic devices currently connected to the home network; and
    (d) converting the series of actions included in the action list into a control signal and controlling the home electronic devices connected to the home network according to the control signal.

2. The method of claim 1, further comprising:
(e) reporting the result of execution of an action controlling a home electronic device connected to the home network.

3. The method of claim 2, wherein the step (e) comprises:
receiving the result of execution of the action from the home electronic device connected to the home network; and
outputting a result message containing the received result of execution of the action.

4. The method of claim 3, wherein the result message includes an execution result success message or an execution result failure message and the execution result failure message includes information on the home electronic device in which an error occurred.

5. The method of claim 1, further comprising:
(f) monitoring the states of the home electronic devices, wherein a state of a home electronic device changes according to the control of the home electronic device connected to the home network.

6. The method of claim 5, wherein the step (f) comprises:
receiving changed home electronic device state information from the home electronic devices connected to the home network; and
updating a device state library which stores the state information of the home electronic devices connected to the home network based on the received home electronic device state information.

7. The method of claim 1, wherein a data structure of the action data includes an action header, a prerequisite field, a sub-action field, and an action effect field.

8. The method of claim 7, wherein the action header field indicates an action, the prerequisite field specifies any prerequisites needed to perform the action, the sub-action field specifies any sub-actions needed to complete execution of the action, and the action effect field specifies a result of execution of the action.

9. The method of claim 8, wherein the step (c) comprises:
(c1) determining whether or not a prerequisite included in the action data corresponding to the logical command is satisfied;
(c2) if the determination result indicates that the prerequisite is not satisfied and an action capable of satisfying the prerequisite in the action library, searching for the action;
(c3) if the determination result indicates that the prerequisite is not satisfied and an action capable of satisfying the prerequisite is not in the action library, outputting an error message;
(c4) if the prerequisite included in the action data corresponding to the logical command is satisfied and there are sub-actions, searching for the sub-actions from the action library; and
(c5) if the prerequisite included in the action data corresponding to the logical command is satisfied and there are no more sub-actions, writing the action in the action list.

10. The method of claim 9, wherein in the step (c1), whether or not the prerequisite is satisfied is determined by referring to a device state library which stores the state information of home electronic devices connected to the home network.

11. The method of claim 10, wherein a data structure of device state data stored in the device state library includes a device ID field which identifies a device, an action field which specifies an action associated with the device, and a device state field which specifies a state of the device with respect to the specified action.

12. The method of claim 1, wherein information stored about the objects is used to interpret a meaning of an action.

13. An apparatus for controlling home electronic devices connected to a home network comprising:
an action library which stores action data for controlling the home electronic devices connected to the home network;
a voice recognition unit which receives a user voice command and recognizes the user voice command as a character command;
a command interpretation unit which converts the character command into a logical command, wherein the command interpretation unit comprises:
a command surface analysis unit which extracts actions and objects from the character command and stores semantic information related to the meaning of the extracted actions and semantic information related to the meaning of the extracted objects, and
a command deep analysis unit which analyzes the stored semantic information to remove semantic ambiguity from the actions and objects based on the semantic information of the character command and outputs the logical command based on the analysis, wherein a time that the character command is received is used to interpret a meaning of an object;
an action planning unit which generates an action list comprising a series of actions used to execute the logical command by searching the action library, wherein the generated action list is influenced by which electronic devices are currently connected to the home network and by state information of the electronic devices currently connected to the home network; and
a home electronic device control unit which converts the series of actions contained in the action list into a control signal and controls the home electronic devices connected to the home network according to the control signal.

14. The apparatus of claim 13, further comprising:
a response management unit which reports the result of execution of an action controlling a home electronic device connected to the home network.

15. The apparatus of claim 14, wherein the response management unit receives the result of execution of the action through a device control unit from the home electronic device connected to the home network and outputs a result message containing the received result of execution of the action.

16. The apparatus of claim 15, wherein the result message is output in the form of voice or characters.

17. The apparatus of claim 15, wherein the result message includes an execution result success message or an execution result failure message and the execution result failure message includes information on the home electronic device in which an error occurred.

18. The apparatus of claim 13, further comprising:
a device monitoring unit which monitors states of home electronic devices which change according to control of the home electronic devices connected to the home network.

19. The apparatus of claim 18, wherein the device monitoring unit receives changed home electronic device state information from the home electronic devices connected to the home network and updates a device state library which stores the state information of home electronic devices connected to the home network based on the received home electronic device state information.

20. The apparatus of claim 13, wherein a data structure of the action data includes an action header, a prerequisite field, a sub-action field, and an action effect field.

21. The apparatus of claim 20, wherein the action header field indicates an action, the prerequisite field specifies any prerequisites needed to perform the action, the sub-action field specifies any sub-actions which are needed to complete execution of the action, and the action effect field specifies a result of execution of the action.

22. The apparatus of claim 21, wherein the action planning unit determines whether or not a prerequisite included in the action data corresponding to the logical command is satisfied, and wherein if the result of determining whether or not a prerequisite included in the action data corresponding to the logical command is satisfied indicates that the prerequisite is not satisfied and an action capable of satisfying the prerequisite is not in the action library, the action planning unit outputs an error message.

23. The apparatus of claim 22, wherein the action planning unit determines whether or not the prerequisite included in the action data corresponding to the logical command is satisfied by referring to a device state library which stores the state information of the home electronic devices connected to the home network.

24. The apparatus of claim 23, wherein a data structure of device state data stored in the device state library includes a device ID field which identifies a device, an action field which specifies an action associated with the device, and a device state field which specifies a state of the device with respect to the specified action.

25. The apparatus of claim 21, wherein the action planning unit determines whether or not a prerequisite included in the action data corresponding to the logical command is satisfied, and wherein if the result of determining whether or not a prerequisite included in the action data corresponding to the logical command is satisfied indicates that the prerequisite is not satisfied and an action capable of satisfying the prerequisite is in the action library, the action planning unit searches for the action in the action library.

26. The apparatus of claim 25, wherein the action planning unit determines whether or not the prerequisite included in the action data corresponding to the logical command is satisfied by referring to a device state library which stores the state information of the home electronic devices connected to the home network.

27. The apparatus of claim 26, wherein a data structure of device state data stored in the device state library stores includes a device ID field which identifies a device, an action which specifies an action associated with the device, and a device state field which specifies a state of the device with respect to the specified action.

28. The apparatus of claim 21, wherein the action planning unit determines whether or not a prerequisite included in the action data corresponding to the logical command is satisfied, and wherein the action planning unit searches for a sub-action in the action library in the event that the prerequisite included in the action data corresponding to the logical command is satisfied and the sub-action is in the action library.

29. The apparatus of claim 21, wherein the action planning unit determines whether or not a prerequisite included in the action data corresponding to the logical command is satisfied, and wherein the action is written in the action list in the event that the prerequisite included in the action data corresponding to the logical command is satisfied and a sub-action is not in the action library.

30. The apparatus of claim 13, wherein information stored about the objects is used to interpret a meaning of an action.

31. A non-transitory recording medium on which a method of controlling home electronic devices connected to a home network of claim 1 is recorded using program codes which can be read out and operated by a computer.

32. A non-transitory recording medium on which a method of controlling home electronic devices connected to a home network of claim 2 is recorded using program codes which can be read out and operated by a computer.

33. A non-transitory recording medium on which a method of controlling home electronic devices connected to a home network of claim 5 is recorded using program codes which can be read out and operated by a computer.

* * * * *